United States Patent [19]

Ohta et al.

[11] 4,338,372

[45] Jul. 6, 1982

[54] GARNET FILM FOR MAGNETIC BUBBLE DEVICE

[75] Inventors: Norio Ohta; Fumihiko Ishida, both of Hachioji; Tadashi Ikeda, Kodaira; Keikichi Ando, Musashino; Yutaka Sugita, Tokorozawa, all of Japan

[73] Assignee: Hitachi, Ltd., Tokyo, Japan

[21] Appl. No.: 187,136

[22] Filed: Sep. 15, 1980

[30] Foreign Application Priority Data

Sep. 17, 1979 [JP] Japan ................................ 54-117986

[51] Int. Cl.[3] ................................................ G11B 5/64

[52] U.S. Cl. ................................ 428/336; 252/62.57; 365/33; 428/693; 428/900; 428/910

[58] Field of Search ............... 428/539, 900, 910, 692, 428/693; 365/33; 156/621, 622; 427/128; 252/62.57, 62.63

[56] References Cited

U.S. PATENT DOCUMENTS

| | | | |
|---|---|---|---|
| 3,665,427 | 5/1972 | Bobeck et al. | 252/62.57 |
| 3,959,006 | 5/1976 | Herrnring et al. | 252/62.57 |
| 4,138,530 | 2/1979 | Breed et al. | 428/539 |
| 4,151,602 | 4/1979 | Haisma et al. | 365/33 |
| 4,165,410 | 8/1979 | Blank | 428/900 |
| 4,169,189 | 9/1979 | Stacy et al. | 428/539 |
| 4,183,999 | 1/1980 | Ota | 252/62.57 |
| 4,267,230 | 5/1981 | Ohta et al. | 365/33 |

FOREIGN PATENT DOCUMENTS

| | | | |
|---|---|---|---|
| 2315558 | 4/1973 | Fed. Rep. of Germany | 252/62.57 |
| 2745266 | 4/1978 | Fed. Rep. of Germany | 365/33 |
| 55-55503 | 4/1980 | Japan | 427/128 |
| 2034297 | 6/1980 | United Kingdom | 365/33 |

OTHER PUBLICATIONS

Randles, M. H., Crystals, Growth, Properties and Applications 1, Springer-Verlag Berlin, Heidelberg, New York, 1978, pp. 79, 80.

Giess et al., Epitaxial Hexaperrite Films on Garnet Substrates, IBM Technical Disclosure Bulletin, vol. 19, No. 9, Feb. 1977.

*Primary Examiner*—Stanley S. Silverman
*Attorney, Agent, or Firm*—Craig and Antonelli

[57] ABSTRACT

A magnetic garnet film for a magnetic bubble memory device in which parts of rare earth element and iron are replaced by predetermined quantities of Gd and Ge, respectively. The garnet film exhibits very small temperature-dependency of the bubble collapse field as well as high Curie temperature, whereby magnetic bubbles of very small diameter can be sustained and controlled with stability over a wide temperature range.

7 Claims, 1 Drawing Figure

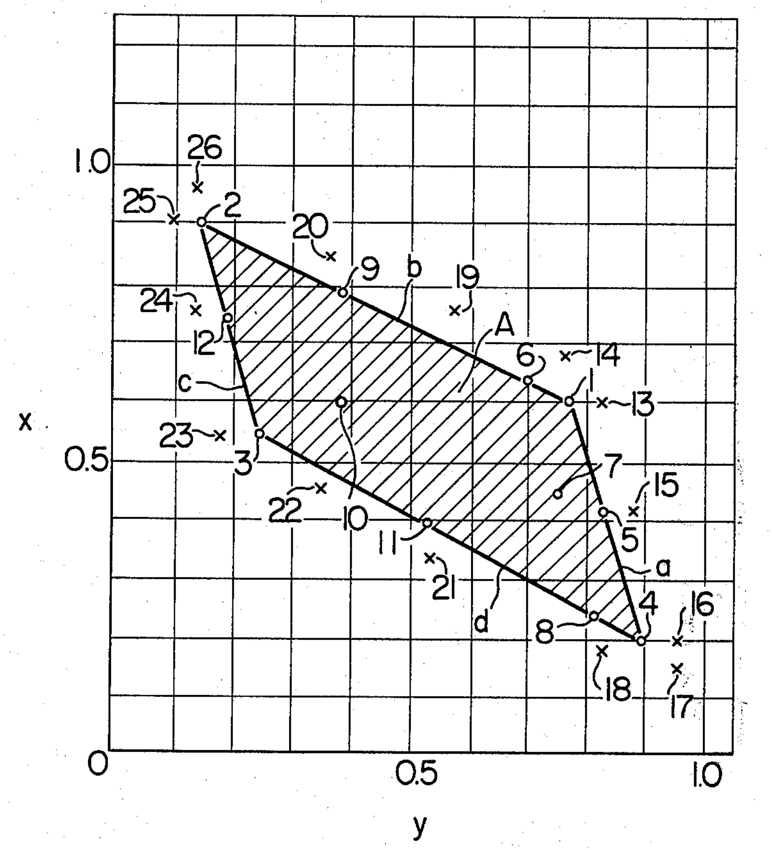
1.0
0.5
0
0.5
1.0
x
y
A
a
b
c
d
1
2
3
4
5
6
7
8
9
10
11
12
13
14
15
16
17
18
19
20
21
22
23
24
25
26

GARNET FILM FOR MAGNETIC BUBBLE DEVICE

BACKGROUND OF THE INVENTION

1. Field of the Invention

The present invention relates to a single crystal garnet film which exhibits a uniaxial magnetic anisotropy perpendicular to a film plane and is suited for supporting magnetic bubbles in a magnetic bubble memory element.

2. Description of the Prior Art

As is well known, the magnetic bubble memory element attracts an attention as one of promising memory devices and many endeavors to develop more practical magnetic bubble memory are (made with activity in many spheres). Among parameters which determine a storage density, (which is the most important factor for memory performances) is a diameter (d) of a magnetic bubble. When the bubble diameter (d) is smaller than 2.5 μm, the storage density or capacity will be remarkably enhanced.

In other words, in order to use the magnetic bubble memory in practical use replacing other memories such as disc memories, semiconductor memories, it is very necessary to reduce the bubble diameter as far as possible, and to increase the storage density significantly.

It is known that the magnetic garnet film with small bubbles has a serious trouble of a large temperature dependence of the bubble collapse field (Ho).

For example, in the case of a garnet film of $(YSmLu)_3(FeGa)_5O_{12}$ supporting magnetic bubbles with a diameter of about 2 μm, of which temperature coefficient of Ho at 30° C. is in a range from −0.30%/°C. to −0.35%/°C.

On the other hand, the corresponding temperature coefficient of a bias field applied by a barium ferrite magnet, which is usually used as a bias magnet in conventional bubble devices, is −0.2%/°C. Thus, there is a large difference between the garnet film of the composition mentioned above and barium ferrite magnet in respect of the temperature dependence of the required magnetic field. It is obvious that a great difference of the temperature coefficient of Ho and bias field Hb will necessarily narrow the temperature range in which the bubbles can be exist controllably. This is unfavorable to use magnetic bubbles for the memory.

By way of example, temperature characteristics of the garnet films for the magnetic bubble memory elements are described in the following references:

(1) R. M. Sandfort, et al., "Temperature variation of Magnetic Bubble garnet film parameters", AIP Conf. Proc. 18, (1) pp 237–241 (1973).

(2) G. G. Summer, et al., "Growth Reproducibility and Temperature Dependencies of the static properties of YSmLuCaFeGe Garnet" AIP Conf. Proc. 34, pp 157–159 (1976).

(3) Jerry W. Moody, et al., "Properties of $Gd_yY_{3-y}Fe_{5-x}Ga_xO_{12}$ films grown by LPE" IEEE transactions on magnetics, Vol. Mag. 9, 377 (1973).

The reference (1) discloses the temperature characteristics of garnet films for the magnetic bubble memory. However, there is no teaching in respect of improvement on the temperature characteristic of the bubble collapse field Ho of the garnet film for the small magnet bubbles.

In the reference (2), garnets of $(YSmLuCa)_3(FeGe)_5O_{12}$ are described, which has a temperature coefficient of Ho to be −0.20%/°C. However, in such a garnet composition, the temperature dependence of bubble collapse field Ho is fixed. It is impossible to control the temperature dependence of Ho to a desired value which is most suitable for the bias field.

The reference (3) discloses garnet compositions containing Gd and Ga. However, these compositions are not intended for use as the materials for the small magnetic bubble devices. Further, there is no description about the bubble collapse field Ho.

SUMMARY OF THE INVENTION

An object of the invention is to solve the problems of the hitherto-known garnet films for the magnetic bubble element described above and provide a single crystal magnetic garnet film for small magnetic bubbles whose temperature coefficient of the bubble collapse field (Ho) is very small and which can be used without failure even at a high temperature.

To attain the above object, it is proposed according to the invention that the temperature coefficient of the bubble collapse field Ho is reduced with the aid of Gd, while Curie temperature Tc is increased with the aid of Ge, thereby to enlarge the temperature range in which the magnetic garnet film can be used for the intended purposes.

BRIEF DESCRIPTION OF THE FIGURE

The accompanying FIGURE is a view to illustrate graphically a preferred range of contents of Gd and Ge according to the invention.

DETAILED DESCRIPTION OF THE PREFERRED EMBODIMENTS

As described hereinbefore, the temperature coefficient (i.e. temperature-depending change of rate) of the bubble collapse field Ho of $(YSmLu)_3(FeGa)_5O_{12}$ garnet and that of the bias field applied by a bias magnet of barium ferrite are from −3.0%/°C. to −0.35%/°C. and −0.2%/°C. respectively.

When the temperature coefficient Ho can be approximated to that of the bias field, it is possible to operate a magnetic bubble memory in stable over a wider temperature range than that of the conventional devices.

It is apparent that much temperature stabilized magnetic bubble memory can be realized by reducing the temperature coefficient of Ho to approximately zero and by using the zero temperature coefficient bias magnet.

The invention starts from the fact that the temperature coefficient of the bubble collapse field Ho depends on the temperature variation of saturation flux density. By reducing the temperature coefficient of the saturation flux density, the temperature coefficient of the bubble collapse field Ho can be reduced to a range of −0.05%/°C. to +0.05%/°C. This is far smaller than the hitherto available value. The decrease in the temperature coefficient of the saturated flux density can be realized by doping a predetermined amount of Gd as a part of rare earth elements.

Further, the temperature range in which the magnetic bubble memory can be operated with stability is determined by Curie temperature of the garnet film. As the Curie temperature is higher, the magnetic bubble memory can be operated with stability at a higher temperature.

According to the teaching of the invention, the temperature coefficient of the bubble collapse field Ho is significantly decreased by substituting a predetermined quantity of Gd, while the Curie temperature is increased by substituting Ge for a part of Fe. This enlarges the operating temperature range with stability.

It goes without saying that the temperature coefficient of the bubble collapse field Ho should be kept as low as possible. However, the temperature coefficient in the range from −0.05%/°C. to +0.05%/°C. is sufficient for practical applications. This range of the temperature coefficient of Ho is very preferable to increase the operating margin by using a bias magnet whose temperature coefficient is almost zero. Thus, the temperature coefficient of the bubble collapse field Ho should be in the range from −0.05%/°C. to +0.05%/°C.

In other words, so far as the temperature coefficient of the bubble collapse field Ho is in the above defined range, it is possible to use a zero temperature coefficient bias magnet. As the consequence, the magnetic bubble memory device can be operated with stability even when a temperature difference between a bubble garnet film and a bias magnet is present on when local temperature differences on a bubble chip are present.

The temperature coefficient of the bias field can be substantially zero by using a rolled magnet of Fe-Cr-Co. The magnetic garnet film according to the invention in combination with such bias magnet allows the magnetic bubble memory to be useful in wide temperature range.

The contents of Gd and Ge are very important for accomplishing the object of the invention and should be in a predetermined range in order to attain desired effect and action.

In Table 1, there are listed characteristics of garnet films having compositions represented by a general formula $(YSmLuCa)_{3-x}Gd_x(Fe_{5-y}Ge_y)O_{12}$ with contents x and y of Gd and Ge being varied.

TABLE 1

| Specimen No. | Composition | x | y | Bubble Diameter d (μm) | Film Thickness h (μm) | Bubble collapse Field Ho (Oe) | Temperature Coefficient of Ho (%/°C.) | Performance |
|---|---|---|---|---|---|---|---|---|
| 1 | $(Y_{0.52}Sm_{0.25}Lu_{0.85}Ca_{0.78})Gd_{0.60}(Fe_{4.22}Ge_{0.78})O_{12}$ | 0.60 | 0.78 | 2.5 | 2.6 | 156 | +0.05 | o |
| 2 | $(Y_{0.10}Sm_{0.65}Lu_{1.20}Ca_{0.15})Gd_{0.90}(Fe_{4.85}Ge_{0.15})O_{12}$ | 0.90 | 0.15 | 0.7 | 0.8 | 542 | +0.05 | o |
| 3 | $(Y_{0.04}Sm_{0.72}Lu_{1.37}Ca_{0.25})Gd_{0.55}(Fe_{4.75}Ge_{0.25})O_{12}$ | 0.55 | 0.25 | 0.7 | 0.7 | 587 | −0.05 | o |
| 4 | $(Y_{0.92}Sm_{0.26}Lu_{0.72}Ca_{0.90})Gd_{0.20}(Fe_{4.10}Ge_{0.90})O_{12}$ | 0.20 | 0.90 | 2.5 | 2.4 | 170 | −0.05 | o |
| 5 | $(Y_{0.69}Sm_{0.26}Lu_{0.80}Ca_{0.83})Gd_{0.42}(Fe_{4.17}Ge_{0.83})O_{12}$ | 0.42 | 0.83 | 2.4 | 2.2 | 163 | 0.00 | o |
| 6 | $(Y_{0.28}Sm_{0.28}Lu_{1.10}Ca_{0.70})Gd_{0.64}(Fe_{4.30}Ge_{0.70})O_{12}$ | 0.64 | 0.70 | 2.0 | 1.9 | 242 | +0.05 | o |
| 7 | $(Y_{0.45}Sm_{0.30}Lu_{1.05}Ca_{0.75})Gd_{0.45}(Fe_{4.25}Ge_{0.75})O_{12}$ | 0.45 | 0.75 | 1.9 | 1.9 | 223 | 0.0 | o |
| 8 | $(Y_{0.55}Sm_{0.31}Lu_{1.08}Ca_{0.81})Gd_{0.25}(Fe_{4.19}Ge_{0.81})O_{12}$ | 0.25 | 0.81 | 1.8 | 1.7 | 215 | −0.04 | o |
| 9 | $(Y_{0.17}Sm_{0.45}Lu_{1.20}Ca_{0.39})Gd_{0.79}(Fe_{4.61}Ge_{0.39})O_{12}$ | 0.79 | 0.39 | 1.1 | 1.2 | 389 | +0.04 | o |
| 10 | $(Y_{0.18}Sm_{0.47}Lu_{1.30}Ca_{0.45})Gd_{0.60}(Fe_{4.55}Ge_{0.45})O_{12}$ | 0.60 | 0.45 | 1.0 | 1.0 | 412 | 0.00 | o |
| 11 | $(Y_{0.44}Sm_{0.49}Lu_{1.15}Ca_{0.52})Gd_{0.40}(Fe_{4.48}Ge_{0.52})O_{12}$ | 0.40 | 0.52 | 0.9 | 0.9 | 393 | −0.05 | o |
| 12 | $(Y_{0.02}Sm_{0.70}Lu_{1.35}Ca_{0.19})Gd_{0.74}(Fe_{4.81}Ge_{0.19})O_{12}$ | 0.74 | 0.19 | 0.8 | 1.0 | 565 | +0.01 | o |
| 13 | $(Y_{0.56}Sm_{0.21}Lu_{0.80}Ca_{0.83})Gd_{0.60}(Fe_{4.17}Ge_{0.83})O_{12}$ | 0.60 | 0.83 | 3.0 | 2.8 | 144 | +0.06 | x |
| 14 | $(Y_{0.66}Sm_{0.18}Lu_{0.72}Ca_{0.77})Gd_{0.67}(Fe_{4.23}Ge_{0.77})O_{12}$ | 0.67 | 0.77 | 2.5 | 2.6 | 192 | +0.08 | x |
| 15 | $(Y_{0.65}Sm_{0.25}Lu_{0.80}Ca_{0.88})Gd_{0.42}(Fe_{4.12}Ge_{0.88})O_{12}$ | 0.42 | 0.88 | 2.9 | 3.1 | 148 | +0.01 | x |
| 16 | $(Y_{0.91}Sm_{0.24}Lu_{0.70}Ca_{0.95})Gd_{0.20}(Fe_{4.05}Ge_{0.95})O_{12}$ | 0.20 | 0.95 | 3.3 | 2.9 | 135 | −0.06 | x |
| 17 | $(Y_{0.83}Sm_{0.28}Lu_{0.82}Ca_{0.92})Gd_{0.15}(Fe_{4.08}Ge_{0.92})O_{12}$ | 0.15 | 0.92 | 2.4 | 2.2 | 163 | −0.09 | x |
| 18 | $(Y_{0.69}Sm_{0.30}Lu_{1.00}Ca_{0.82})Gd_{0.19}(Fe_{4.18}Ge_{0.82})O_{12}$ | 0.19 | 0.82 | 1.8 | 1.9 | 231 | −0.08 | x |
| 19 | $(Y_{0.12}Sm_{0.35}Lu_{1.20}Ca_{0.58})Gd_{0.75}(Fe_{4.42}Ge_{0.58})O_{12}$ | 0.75 | 0.58 | 1.3 | 1.6 | 318 | +0.10 | x |
| 20 | $(Y_{0.08}Sm_{0.40}Lu_{1.30}Ca_{0.37})Gd_{0.85}(Fe_{4.63}Ge_{0.37})O_{12}$ | 0.85 | 0.37 | 1.0 | 1.1 | 410 | +0.09 | x |
| 21 | $(Y_{0.52}Sm_{0.52}Lu_{1.10}Ca_{0.52})Gd_{0.34}(Fe_{4.48}Ge_{0.52})O_{12}$ | 0.34 | 0.52 | 0.9 | 0.9 | 398 | −0.08 | x |
| 22 | $(Y_{0.10}Sm_{0.61}Lu_{1.50}Ca_{0.35})Gd_{0.44}(Fe_{4.65}Ge_{0.35})O_{12}$ | 0.44 | 0.35 | 0.8 | 0.9 | 481 | −0.07 | x |
| 23 | $(Y_{0.02}Sm_{0.75}Lu_{1.50}Ca_{0.19})Gd_{0.54}(Fe_{4.81}Ge_{0.19})O_{12}$ | 0.54 | 0.19 | <0.7 | 0.8 | — | — | x |
| 24 | $(Y_{0.02}Sm_{0.72}Lu_{1.38}Ca_{0.14})Gd_{0.74}(Fe_{4.86}Ge_{0.14})O_{12}$ | 0.74 | 0.14 | <0.7 | <0.7 | — | — | x |
| 25 | $(Y_{0.05}Sm_{0.65}Lu_{1.30}Ca_{0.10})Gd_{0.90}(Fe_{4.90}Ge_{0.10})O_{12}$ | 0.90 | 0.10 | <0.7 | <0.7 | — | — | x |
| 26 | $(Y_{0.02}Sm_{0.55}Lu_{1.33}Ca_{0.14})Gd_{0.96}(Fe_{4.86}Ge_{0.14})O_{12}$ | 0.96 | 0.14 | <0.7 | 0.8 | — | — | x |

In the Table 1, a circle (o) indicates that the characteristic or performance of the associated garnet film is good, while a multiplication sign (x) indicates that the characteristic is undesirable. More specifically, the garnet film which meets the conditions that the small size magnetic bubbles with a diameter not greater than 2.5 μm can be supported with stability and that the temperature coefficient of the bubble collapse field Ho lies in the range of −0.05%/°C. to +0.05%/°C. is considered as having the desired characteristic or performance and attached with the circle (o), while the films which do not fulfill the above conditions are indicated by the penalty signs (x).

Further, the accompanying drawing graphically illustrates the results listed in the Table 1 with the contents x and y of Gd and Ge, respectively, being taken as parameters. In this figure, the signs "o" and "x" have the same meanings as those in the Table 1 and numerals attached to these signs correspond to the specimen numbers in the Table 1.

As can be seen from the drawing, when the contents x and y of Gd and Ge, respectively, lie in a region A enclosed by line segments a, b, c and d inclusive thereof, the magnetic bubbles having diameters not greater than 2.5 μm can be sustained with stability and at the same time the temperature coefficient of the bubble collapse field Ho falls within the range of −0.05%/°C. to +0.05%/°C. However, when the contents x and y are outside of the region A, these conditions are not met, which in turn means that the desired characteristic can not be obtained.

More particularly, when the contents x and y are in a region at the right side of the line segment a, the diameter of the magnetic bubbles becomes greater than 2.5 μm, while in a region over the line segment b the temperature coefficient of the bubble collapse field Ho is greater than 0.05%/°C. These films is not desirable in the case of using the zero temperature coefficient bias magnet. In the case where the contents x and y are in a region at the left side of the line segment c, the diameter of the magnetic bubble becomes too small to be detected. When the contents x and y are in a region below the line segment d, the absolute value of the temperature coefficient of the field intensity Ho is too large in the negative sense. These garnet films is not desirable for a use combining with the zero temperature coefficient bias magnet.

The garnet film according to the invention is very favorable for small bubbles, and their temperature coefficient of the bubble collapse field can be reduced to the extremely small value.

Further, the garnet film according to the invention exhibits Curie's temperature of 215° C. which is higher than that of the hitherto known Ga substituted garnet film, by 30° C. or more, which can support the same bubble diameter. The temperature range which bubbles exist in stable is enlarged by 40° C. This feature is very advantageous for a bubble memory in a practical use.

The garnet film according to the invention can be grown on a single crystal $Gd_3Ga_5O_{12}$ substrates (usually on (111) plane) by the conventional liquid phase epitaxy. An example will be described below.

Raw materials (oxides) are placed in a platinum crucible with predetermined quantities and are heated at 1200° C. for 10~20 hours to make a uniform melt.

The temperature of the melt is decreased at a rate of 50° C./hour~100° C./hour to a temperature which is higher than a saturation temperature (about 920° C.) by 10° C. to 20° C.

The melt is agitated for 30 minutes by rotating the platinum tool at 200 rpm. Subsequently, the temperature of the melt is cooled to a temperature which is lower than the saturation temperature by 5° C. to 30° C. and is kept in this state for 30 minutes to stabilize uniformity of the melt.

A substrate of $Gd_3Ga_5O_{12}$ is placed above the liquid surface of the melt at a distance of ca. lcm, which is done for a pre-heating for 15 minutes. Thereafter, the substrate is immersed in the melt at a position under the liquid surface by ca. 1 cm and rotated at a speed of 30 to 100 rpm to effect the epitaxial growth.

After the growth to a desired thickness, the substrate of $Gd_3Ga_5O_{12}$ is taken out of the melt and rotated at ca. 400 rpm to remove unwanted deposit of the melt.

The magnetic garnet film for the magnetic bubble memory element according to the invention can be grown with various thicknesses. However, it will usually be practical to select the thickness of the garnet film in the range of about 50% to 100% of the bubble diameter d.

The magnetic garnet film according to the invention can support very small diameter magnetic bubbles and be operated with an improved stability. Further, it is possible to vary the diameter of the magnetic bubble by varying the film thickness.

The film thickness which can be adapted in the magnetic garnet film for the magnetic bubble memory element is substantially in a range if 0.2 μm to 4.0 μm and most preferably in a range of 0.3 to 1.2 μm.

We claim:

1. A garnet film for a magnetic bubble device, said garnet film being formed on a substrate of $Gd_3Ga_5O_{12}$ and having a composition represented by a general formula of $(YSmLuCa)_{3-x}Gd_x(Fe_{5-y}Ge_y)O_{12}$ where values of x and y are in a region enclosed by a segment a connecting a point 1 (0.78; 0.60) and a point 4 (0.90; 0.20) shown in the accompanying drawing, a segment b connecting said point 1 (0.78; 0.60) and a point 2 (0.15; 0.90), a segment c connecting said point 2 (0.15; 0.90) and a point 3 (0.25; 0.55) and a segment d connecting said point 3 (0.25; 0.55) and said point 4 (0.90; 0.20) inclusively.

2. A garnet film for a magnetic bubble device, said garnet film being formed on a substrate of $Gd_3Ga_5O_{12}$ and consisting essentially of $(YSmLuCa)_{3-x}Gd_x(Fe_{5-y}Ge_y)O_{12}$, where the values of x and y are in a region A enclosed by a segment a connecting a point 1 (0.78; 0.60) and a point 4 (0.90; 0.20) shown in the accompanying drawing, a segment b connecting said point 1 (0.78; 0.60) and a point 2 (0.15; 0.90), a segment c connecting said point 2 (0.15; 0.90) and a point 3 (0.25; 0.55), and a segment d connecting said point 3 (0.25; 0.55) and said point 4 (0.90; 0.20), inclusively.

3. A garnet film as set forth in claim 1 or claim 2, wherein the thickness of said garnet film is of about 0.2 μm to 4.0 μm.

4. A garnet film as set forth in claim 3, wherein the thickness of said garnet film is of about 0.3 to 1.2 μm.

5. A garnet film as set forth in claim 1 or claim 2, wherein said garnet film is formed on a (111) oriented plane of said substrate.

6. A garnet film as set forth in claim 1 or claim 5, wherein said garnet film is capable of supporting magnetic bubbles with a diameter not greater than 2.5 μm with stability and of exhibiting a temperature coefficient of the bubble collapse field Ho in the range of −0.05%/°C. to +0.05%/°C.

7. A garnet film as set forth in claim 6, wherein said garnet film is capable of exhibiting Curie temperature of 215° C.

* * * * *